Patented July 16, 1929.

1,721,214

UNITED STATES PATENT OFFICE.

FRITZ GOEDECKE, OF THUSIS, SWITZERLAND.

DIETARY COMPOSITION.

No Drawing. Application filed November 14, 1927, Serial No. 233,304, and in Germany August 11, 1925.

My invention relates to an improved dietary composition.

The object of my invention is to provide a dietary composition which contains besides vitamines phosphorus compounds containing phosphorus in a form in which it is readily taken up and assimilated by the human organism, whereby surprisingly beneficial effects are obtained.

With this object in view my improved dietary composition consists of a mixture of vitamines and of inosite hexaphosphoric acid or its salts, preferably calcium salts. Inosite hexaphosphoric acid and its salts are mainly contained in seeds, roots and subterranean turions of plants and constitute the phosphorus reserve substance of the plants. The acid or its salts may be obtained from the plants by the process such as described in my U. S. application for patent filed November 14, 1927, Serial No. 233,305.

Vitamines may be prepared from plants by any of the known or any other suitable or preferable process.

I wish it to be understood, that in the present specification and claims I mean by "inosite hexaphosphoric acid" the phosphoric acid ester of inosite as found in plants and that I do not wish to limit myself to any particular inosite such as mono inosite or d-inosite or i-inosite. Furthermore I wish it to be understood, that by the word "vitamines" I mean the substances now commonly called vitamines whose chemical character and constitution are at present unknown, but which, when contained in food have a very marked beneficial effect on the human organism and I wish it to be understood, that I do not limit myself to any particular vitamines such as vitamines A, B, C, D or E, which vitamines certainly are not all the vitamines to be found in plants.

It is well known at present that so called isolated vitamines are highly unstable and extremely sensitive to light, air and many chemical compounds, so that the said so called isolated vitamines are frequently found to be deprived of the beneficial activity, which the vegetable raw materials, from which they have been isolated, possess to a marked extent.

Now I have discovered that vitamines or substances comparatively rich in vitamines retain their physiological activity or are preserved for a comparatively very long time if mixed or combined with inosite hexaphosphoric acid and its alkali earth salts, both the vitamines and the inosite hexaphosphoric acid being obtained from the same plants, no matter what vitamines and what inosite hexaphosphoric acid may be contained in such plants.

For preparing my improved dietary composition I may mix aqueous solutions of acid salts and preferably the acid calcium salts of inosite hexaphosphoric acid with an aqueous solution of vitamines and evaporate the mixture to the desired concentration if desired in vacuo or even to dryness. Or I may introduce neutral salts, preferably the neutral calcium salt of inosite hexaphosphoric, such neutral salts being practically insoluble in water, into an aqueous solution of vitamines and may then concentrate the mixture to the desired degree or even to dryness, if desired in vacuo. Or I may mix dried pulverulent inosite hexaphosphoric acid or its acid or neutral salts, preferably calcium salts with dry pulverulent vitamines. The proportion of vitamines and the inosite hexaphosphoric acid may be varied within wide limits depending on the particular conditions under which the composition has to be used. In all cases the vitamines obtained from the same plants from which the inosite hexaphosphoric acids and its salts are manufactured, as disclosed in my U. S. application for patent filed November 14, 1927, Serial No. 233,305, above referred to, may be added to the inosite hexaphosphoric acid and its salts so manufactured.

This process consists in treating the suitably comminuted plants with slightly acidified water and precipitating from the extract thus obtained the inosite hexaphosphoric acid in the form of its neutral calcium or magnesium salts by calcium or magnesium carbonate.

The precipitate thus obtained and separated from the supernatent liquid may then be decomposed by a suitable acid whereby the inosite hexaphosphoric acid is obtained, and from this its acid calcium or magnesium salts may be obtained.

The said liquid which has not been exposed to the action of any strong reagents contains the vitamines in an unaltered state and may be further treated in any known or preferred manner for obtaining therefrom the vitamines in a more or less concentrated form.

As the salts and more particularly the acid salts of the inosite hexaphosphoric acid are or may be accompanied by the free acid itself I wish it to be understood that by inosite hexaphosphoric acid and its salts, I mean such salts accompanied by a more or less great percentage of the free acid itself.

While I prefer to use the calcium salts of inosite hexaphospheric acid I may also use the magnesium salts of the acid since in the plants besides the calcium salts also the magnesium salts of this acid are found, it may happen that even if the calcium salt is prepared it will be accompanied by the magnesium salt and vice versa.

My improved composition may be used in a dry pulverulent state, if it is desired to add it to chocolate or similar articles, or it may be used in the state of a solution or in a soluble state if it is desired to add it to beverages such as tea, or to liquid food such as soups.

As an example of the percentage of inosite hexaphosphoric acid and its salts and of the vitamines I may use one part by weight of the former to about one part by weight of the latter, both being in the dry state, but this proportion may vary within wide limits as above stated without departing from the essence of my invention.

My improved composition may be kept unchanged for a long time without injury if not exposed to air or if the access of microorganisms to the same is prevented.

What I claim is:

1. A dietary composition consisting of inosite hexaphosphoric acid and its alkali earth metal salts and of vitamines, the vitamines and the inosite hexaphosphoric acid being obtained from the same plants.

2. A dietary composition consisting of inosite hexaphosphoric acid and its calcium salts and of vitamines, the vitamines and the inosite hexaphosphoric acid being obtained from the same plants.

3. A dietary composition consisting of inosite hexaphosphoric acid and its alkali earth metal salts and of vitamines both being in a dry pulverulent state and intimately mixed, the vitamines and the inosite hexaphosphoric acid being obtained from the same plants.

4. A dietary composition consisting of inosite hexaphosphoric acid and its alkali earth metal salts and of vitamines, both being in a dry pulverulent state and substantially equal in weight and intimately mixed, the vitamines and the inosite hexaphosphoric acid being obtained from the same plants.

In testimony whereof I have affixed my signature.

FRITZ GOEDECKE.